H. L. DUXSTAD.
APPARATUS FOR UNLOADING HAY AND OTHER MATERIAL.
APPLICATION FILED JULY 27, 1912.
1,054,095.  Patented Feb. 25, 1913.
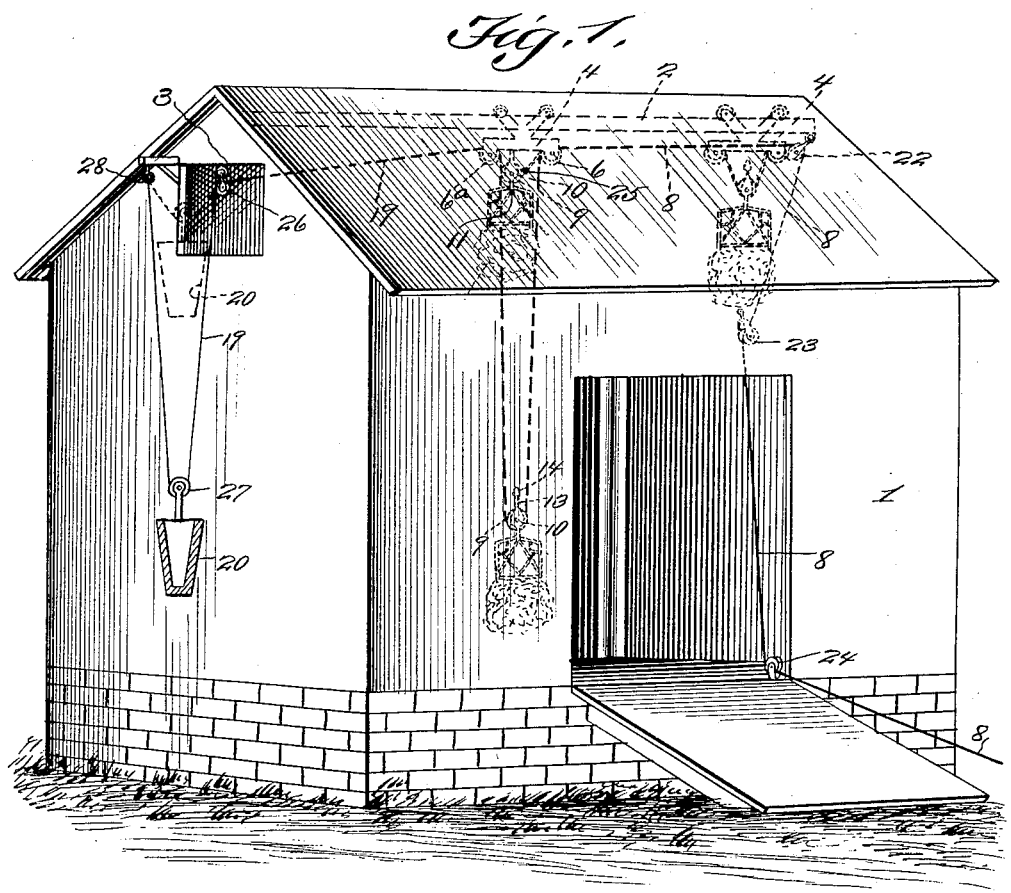
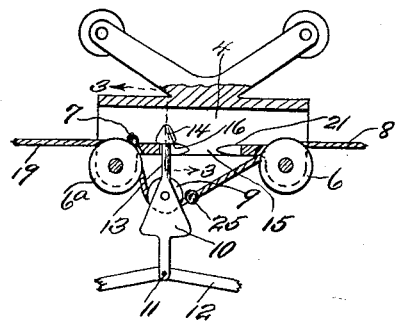
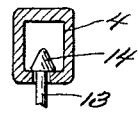
Inventor
Henry L. Duxstad
Witnesses

UNITED STATES PATENT OFFICE.

HENRY L. DUXSTAD, OF CAMBRIDGE, WISCONSIN.

APPARATUS FOR UNLOADING HAY AND OTHER MATERIAL.

1,054,095. Specification of Letters Patent. Patented Feb. 25, 1913.

Application filed July 27, 1912. Serial No. 711,845.

*To all whom it may concern:*

Be it known that I, HENRY L. DUXSTAD, a citizen of the United States, residing at Cambridge, in the county of Dane and State of Wisconsin, have invented a new and useful Apparatus for Unloading Hay and other Material; and I do hereby declare the following to be a full, clear, and exact description of the invention, such as will enable others skilled in the art to which it appertains to make and use the same.

This invention relates to a new and useful apparatus for unloading hay and the like.

As one of the objects of the invention it is the aim to provide a simple, inexpensive and efficient apparatus, designed especially for unloading hay and the like in barns, or other housings.

The invention comprises further features and combination of parts, as hereinafter set forth, shown in the drawings and claimed.

In the drawings:—Figure 1 is a view showing the application of the hay unloading apparatus, showing the fork in one position after being loaded and in two other positions after being hoisted. Figs. 2 and 3 are detail views.

Referring more particularly to the drawings 1 designates the barn or the like having a horizontally arranged track adjacent the roof thereof. This track 2 extends from the window opening 3 at one end of the barn, to the rear end of the barn. The usual form of carrier 4 is mounted upon the track and is provided with pulleys 6 and 6ª. Secured at 7 is a rope or cable 8, which passes over the pulley 9 of the member 10, which in turn is pivoted at 11 to the hay fork 12, the detail structure of which forms the subject matter of the co-pending application filed second day of August, 1912, Serial No. 712,920. This member 10 is provided with a projection 13 having an enlargement 14 adapted to enter the opening 15 of the carrier so that the enlargement will engage the inclined surfaces 16 of the carrier, in order to assist in holding the fork elevated, as the same and its load of hay is being drawn or traveled through the barn. However, when the fork or grappling device is operated to release the hay, which relieves the fork of its excessive weight, the rope 19 is partially pulled or operated by the weight receptacle 20, to disengage the enlargement of the projection from the inclined surfaces 16, so as to dispose the enlargement in engagement with the inclined surfaces 21 on the other side of the opening 15, after which the weight receptacle will return the fork to the front end of the barn or its normal position. When the fork is thus arranged a slight pulling action is imparted to the rope 8 sufficiently to disengage the enlargement from the inclined surfaces 21, thereby allowing the fork to gravitate to the ground upon the outside of the barn, where it may again be loaded. The rope 8 passes over the pulleys 22, 23 and 24, and draft animals (not shown) are adapted to be connected to its end. The rope 19 is connected at 7 to the rope 8, and the two ropes 8 and 19 are designed to be limited in their movements relative to the pulley 6ª by the projections 25 and 7 on the ropes 8 and 19. The rope 19 passes over the pulley 26, and the pulley 27 of the weight receptacle, and is connected at 28 to the front end of the barn. The weight receptacle is adapted to receive additional weight, such as sand or lead lugs or the like, in order to increase its weight to correspond to the load on the fork.

From the foregoing it is to be observed there has been devised a simple and efficient unloading apparatus and one which has been found desirable and practical.

In the drawings there is disclosed one form only of the invention, but in practical fields this form may necessitate alterations, to which the patentee is entitled provided the alterations are comprehended within the scope of what is claimed.

The invention having been set forth, what is claimed as new and useful is:—

In combination; a track; a carrier movable thereon having a tubular portion provided at each end with a pulley; a hoisting cable extending horizontally and engaging over the pulleys, said cable being arranged in a loop between the pulleys and provided with a weight to haul the carrier horizontally in one direction; said tubular portion having a horizontal opening, which terminates in a restricted portion at each end, located between the pulleys; a member having a pulley engaging in said loop, and provided with a suspended fork, said member having a neck terminating in an enlarged head beyond the second pulley, the head of which enters the opening, while the neck is adapted to engage or enter one or the other of said restricted portions, to prevent the head leaving the opening, thereby detachably retaining the member on the carrier; the cable adapted to be manipulated to act as means to effect a connection and disconnection of the member to and from the carrier, said loop of the cable between the pulleys of the carrier having means for connecting the cable to the carrier, so that the carrier may be moved in either direction on the track.

In testimony whereof I have signed my name to this specification in the presence of two subscribing witnesses.

HENRY L. DUXSTAD.

Witnesses:
 ROHE MEYER,
 ROBERT A. BOSWELL.

Copies of this patent may be obtained for five cents each, by addressing the "Commissioner of Patents, Washington, D. C."